United States Patent [19]

Gancy

[11] 4,430,242
[45] Feb. 7, 1984

[54] NOVEL ROAD AND HIGHWAY DEICER AND TRACTION AGENT, AND PROCESS FOR ITS MANUFACTURE

[76] Inventor: Alan B. Gancy, 265 Robineau Rd., Syracuse, N.Y. 13207

[21] Appl. No.: 404,365

[22] Filed: Aug. 2, 1982

[51] Int. Cl.$^3$ .............................................. C09K 3/18
[52] U.S. Cl. ........................................ 252/70; 106/13; 423/155; 423/173; 423/430; 423/635; 423/637; 562/607; 562/608
[58] Field of Search .......................... 252/70; 106/13; 423/155, 173, 430, 635, 637; 562/607, 608

[56] References Cited

FOREIGN PATENT DOCUMENTS 3209128 10/1982 Fed. Rep. of Germany ........ 252/70
57-149380 9/1982 Japan ..................................... 252/70

*Primary Examiner*—John E. Kittle
*Assistant Examiner*—Robert A. Wax

[57] ABSTRACT

A process of reacting aqueous acetic acid and crushed raw limestone in such a way as to produce a mixture of calcium acetate, calcium acid-acetate, and unreacted raw limestone devoid of undesirable fine limestone. Such a product is useful in winter highway treatment, where the environmentally safe soluble acetates function to depress the freezing point of water, and the limestone acts as a roadway traction agent. When as much as 3 mols of acetic acid per mol of active calcium carbonate in limestone are used, all the limestone is consumed, with virtually 100% yield of calcium acid-acetate.

8 Claims, No Drawings

NOVEL ROAD AND HIGHWAY DEICER AND TRACTION AGENT, AND PROCESS FOR ITS MANUFACTURE

BACKGROUND OF THE INVENTION

The subject matter of the present invention relates to a novel non-polluting road and highway deicer featuring a traction agent which is an integral part of the deicer. The combination deicer and traction agent is the consequence of an economical manufacturing process whereby said deicer and traction agent are co-produced in a single-step operation. More specifically, natural limestone is combined with aqueous acetic acid in a rotary kiln or similar apparatus to produce, in general, an intimate admixture containing calcium acid-acetate, calcium acetate, and unreacted limestone. The acetate and acid-acetate of calcium, being both highly soluble in water, function as deicers while the now relatively coarse limestone functions as the road traction agent.

DESCRIPTION OF PRIOR ART

Salt, or sodium chloride, is the most widely used surface deicer in the United States today, the estimated usage rate being twelve million tons per year. Yet, according to widely publicized reports by the U.S. Environmental Protection Agency (EPA) the societal cost associated with the use of salt deicer is about 14 fold the cost of the reagent and its disbursement. Untold damage caused by the chloride component is salt includes metallic corrosion of bridge structures and of roadway vehicles. The sodium component of salt has been found to increase the sodium content of groundwaters to dangerous levels in many instances. Salt is damaging to soil, ultimately resulting in accelerated wind and rain erosion. Hence there is great incentive in the national interest to discover a non-polluting alternative to salt.

Salt is customarily mined, crushed to size, and shipped either in bulk or in bags to its destination. It has the advantage of being cheap, and being almost ideal physically to carry out the road deicing function. It is dispensed from mechanical devices known as spreaders, directly to road surfaces.

While many municipal highway departments use only salt to treat the winter roads and highways, many communities use a mixture of salt and sand. The latter users have found over many years of experience that salt alone is insufficient to render a particular stretch of road safe for vehicular traffic. One reason is that dangerous road conditions may exist while at the same time the temperature is below that at which salt will function as a deicer. In this event the sand component of the sand/salt mixture inproves vehicular traction immediately upon its application to the road surface. The salt component remains in place and is available to melt ice later as the temperature rises.

Salt/sand mixtures are mandatory in terrain which is hilly, whether such hills are long and gradual, or short and steep.

Municipal highway users would prefer to use salt alone because, for deicing purposes only, a given truckload of salt goes much further than a salt/sand mixture. In one instance the user reported having to make 4 times the number of truck round-trips when using salt/sand, over the number of salt round-trips. The reason for this is that for salt to be an effective deicer it must be applied at a certain minimal coverage rate, or dosage, to the road surface. When sand now accompanies this minimally required salt dose, it is clear that many more truck trips are now required to dispense sand/salt mixtures.

Sand and salt are used after mixing in various proportions, depending on road and weather conditions. A typical mixture used in central New York State comprises one part salt and seven parts sand. As may be imagined, mixtures are difficult to blend into a uniform product, let alone in the desired ratio of salt to sand. Furthermore the blending represents an added operational cost compared to the use of salt or sand alone.

Users further dislike the necessity of using sand because of the clean-up of roads and highways which is required each spring. Clean-up costs should properly be added to dispensing costs in any computations covering the price of keeping highways safe. The finely divided component of sand, which may be sand or may be clay, becomes a roadway airborne dust problem in spring and summer. This fine component also forms undesirable slimes when wet with rain water. Actually, this fine component does little good for vehicular traction during winter application. Grading of the original sand to remove the finest fraction should go a long way towards alleviating these problems. Evidently, however, practioners have either not considered this solution or, considering it, have found it too costly. Sand suppliers, for example, would presumably have to find a market for the fine fractions rejected in the grading operation. Wet-classification would obviously be to expensive, necessitating as it would a final sand drying step. And sand which is even slightly wet does not lend itself to dry classification; again, drying costs would be prohibitive.

The moisture content of sand used in winter deicing is problematic. If the water freezes the sandpile is well nigh intractable. Some users treat their sand with calcium chloride solution to prevent if from freezing.

Most users store sand and/or salt under cover from the elements to avoid aggravation of the freezing problem through rainfall or snowfall. Those who do not use covered storage facilities often have serious problems with freezing of salt piles as well as sandpiles. In many cases the caked salt is so refractory that it can no longer be used. In that event it must be hauled to a dumpsite, an expensive and environmentally undesirable operation.

Some municipalities use salt in combination with crushed limestone which takes the place of sand as the traction agent. Such users report that the subsequent clean-up problem is not nearly so bad as with sand, but are unable to proffer a reason why. Whether a user selects sand or limestone depends upon local availability and price. As with sand, there is an operations cost associated with the limestone/salt blending process. Also, the clean-up problem in the limestone problem is aggravated by the presence of fine limestone particles, the consequence of the limestone crushing process no matter which crushing apparatus is employed.

As for the deicer itself, calcium acetate has been proposed as a non-polluting chemical agent. Containing no sodium, it would neither disperse soil, nor contaminate ground waters. Its use would significantly reduce metallic corrosion; in fact, there is some evidence that it can function as a metal corrosion inhibitor in certain cases.

Indeed, several of my co-pending applications are based upon commercially practical variations on the concept of using calcium acetate as a deicer. As will be seen in the ensuing discussion, however, the present invention involves more than just the use of calcium acetate, not the least important feature of which is a novel, low-cost process for manufacturing the acetate-containing deicing formulation. Additionally, the product-by-process part of the invention automatically yields a deicing formulation which incorporates a traction agent. Further distinctive features of the product/process of the present invention will become evident in the ensuing discussion.

OBJECTS OF THE INVENTION

One object of the present invention is to provide an economical, industrially feasible process for the production of a non-polluting deicing compound.

It is a further object of the invention to produce a water-soluble deicing agent into which is incorporated a water-insoluble component which functions as a highway traction agent.

Yet another object is to produce an intimate blend of said deicing agent and said traction agent automatically, as a consequence of a single-step manufacturing process.

Another object of the invention is to produce a relatively coarse traction agent, which is an automatic consequence of said single-step manufacturing process.

It is a further object of the invention to provide a manufacturing process for producing the combined deicer and traction agent, wherein there are no by-products or waste products to contend with in said process.

A further object of the invention is to provide a wide range of deicer/traction-agent ratios while avoiding the costly blending operations which are normally required when using deicer/traction-agent blends.

Another object is to utilize lower cost raw limestone, in contrast to calcined limestone, in the production of deicer/traction-agent formulations.

Other objects of the invention will become explicit as the invention is described in further detail.

SUMMARY OF THE INVENTION

A process of manufacturing in intimate admixture of raw limestone, calcium acetate, and calcium acid acetate by the controlled addition of aqueous acetic acid to crushed raw limestone in a rotary reactor or similar apparatus. Acetic acid is in general used in an amount which leaves some limestone unreacted, the relative insufficiency being related to the desired ratio of deicer to traction agent in the final product. Relative amounts of acetic acid can range from 20% to 100% stoichiometric for this purpose. The damp intermediate product of said reaction is dried using conventional drying procedures to yield the final anhydrous product.

As the stoichiometric amount of acid exceeds 100%, less unreacted limestone is present, until at the 150% stoichiometric acid level it is completely absent. At this point, the product is virtually 100% calcium acid-acetate which I claim to be a non-polluting highway deicer. The remarkable feature of this reaction series, I have discovered, is that no matter what the relative amount of acid used in the reactor—up to 150% stoichiometric—practically all of the acid ends up in solid form in the product, and very little is lost through volatilization.

The strength of acetic acid employed can vary over a wide range. Too dilute an acid will be detrimental to the physical consistency of the reaction bath; it will also increase the requirements for costly downstream evaporation steps. Too high a concentration of acetic acid will be inhibiting to the central chemical reaction. An acetic acid solution of 70% by weight is preferred, although strengths as low as 50% and as high as 90% can be utilized. Low cost waste streams containing acetic acid are candidate raw materials for the process.

The dried product can be handled, shipped, stored and dispensed onto roadways without further treatment.

One process/product variant calls for the addition of calcium chloride liquor to the reaction batch prior to drying. The amount of calcium chloride added should not exceed unity in the mol ratio of calcium chloride to equivalent calcium acetate in the product. The added calcium chloride improves the ice-melting capabilities of the product. Its inclusion obviously results in the introduction of chloride to the environment. However, in certain instances the contamination by chloride can be an acceptable trade-off for more rapid and more complete deicing.

Another process/product variant is the ratio of soluble magnesium to calcium in the product. Raw limestones containing relatively low magnesium/calcium ratios are preferred in the process, but only for the reason that use of higher ratios represents a waste, so to speak, of potentially valuable magnesium. All magnesium/calcium ratio limestones, including dolomitic limestones, are feasible in the process of the invention. For deliberate incorporation of magnesium deicing agent in the products of the invention, some calcined magnesium-containing limestone may be added to the raw limestone feed to the reactor.

DESCRIPTION OF THE PREFERRED EMBODIMENTS

Calcium acetate has been suggested as a non-polluting surface and roadway deicer. A logical source of calcium is the relatively inexpensive raw limestone. However, it is well known that calcium carbonate, the major component of limestone, reacts rather incompletely with acetic acid. Indeed, as described in one of my co-pending applications, I teach the production of soluble calcium deicer from raw limestone, the novel feature of which is a means to ensure completeness of reaction. In that case, however, a near-saturated aqueous solution was formed as an intermediate. This solution had to be evaporated to dryness to produce the final product. Such extensive evaporation is costly.

In the present invention relatively little water is required in the reaction. This has two advantageous consequences: (1) the reaction batch is non-caking and can be handled in conventional engineering hardware such as a rotary kiln-type reactor or its equivalent; (2) downstream drying requirements are considerably reduced, and this results in a much more economical process. Specifically, the raw limestone can be used as mined, i.e., with relatively low water content. The water can be introduced to the reactor by way of the acetic acid. Seventy per cent acetic acid is a favorable acid concentration although acid strengths ranging from 50% to 90% are feasible. Water can be introduced to the limestone first, and then the whole reacted with highly concentrated acid including 100% acetic acid. Generally, however, it is preferred to adjust the acid strength to the desirable level, and then to introduce that solution to dry raw limestone.

In one embodiment of the present invention an insufficiency of acid is used. As a consequence of this, the product will contain unreacted raw limestone. This unreacted limestone then functions as the traction agent component of the deicer product. Furthermore, this raw limestone in the product differs from that introduced as raw material in one very important aspect: it is relatively coarse. I have discovered that the acid which acts on the raw limestone preferably consumes the finest fraction material. Fine particles in the feed exhibit the highest surface area per unit weight. And inasmuch as the rate of reaction with acid is a function of limestone surface area, it is found that the fines are consumed relatively more rapidly. The result is that the original raw limestone particle size distribution is favorably altered. While some original coarse particles are reduced in size after reaction with acid, the majority of acid was utilized to consume the finer limestone particles. This results in a product which is relatively free of limestone fines. Such a product, as discussed earlier, requires less environmental clean-up after the spring thaws.

Note that regardless of the particular limestone grind used in the reaction, fines will always be present unless they are deliberately removed in some type of classification operation. This is an unavoidable consequence of using any conventional grinding apparatus. The process of the present invention represents an automatic "chemical classification", and thus a separate classification step is avoided.

The relative amount of traction agent in the product is dictated by the amount of acid used relative to limestone feed. Anywhere from 20% to 100% of the stoichiometric acid can be used, where the term "stoichiometric" arbitrarily refers to 2 mols of acetic acid (anhydrous basis) per mole of active calcium carbonate in the limestone; i.e.,

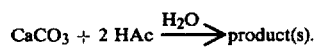

$$CaCO_3 + 2\,HAc \xrightarrow{H_2O} product(s).$$

As discussed earlier, I have discovered that the use of 100% of the stoichiometric acid requirement in this "dry reaction" does not ensure that all of the calcium carbonate is reacted. What inevitably remains unreacted functions as traction agent. The unused or "excess" acid, I have found, is not lost through volatilization, but combines chemically with the calcium acetate already formed to produce calcium acid-acetate.

In another embodiment of the invention, in which 150% of the stoichiometric acid is used, however, all of the active calcium carbonate is consumed, and there is no traction agent present except those insolubles which accompany the particular raw limestone used. I have discovered that this reaction produces virtually 100% yield of calcium acid-acetate, a deicer in its own right. The pH of an aqueous calcium acid-acetate solution is below 7, and is therefore acidic, whereas that of calcium acetate is slightly above 7 and is basic. By adjusting the acid feed to the reactor between 150% stoichiometric and 100% stoichiometric and lower, the desired pH of product solutions may be attained.

Thus I have discovered that crude calcium acid-acetate deicer can be produced at virtually 100% yield from raw limestone, probably the cheapest known calcium raw material. Furthermore, mixtures of calcium acid-acetate and other calcium acetates can be obtained by operating with somewhat less than the 150% stoichiometric amount of aceteic acid. These mixtures are deicers in their own right, and they are characterized as containing some unreacted (coarse) limestone which can function as a traction agent. By appropriate adjustment of the acid feed stoichiometry, the desired deicer pH may also be obtained.

The employment of acetic acid at greater than 150% stoichiometric is not recommended. Any excess over 150% is simply lost through volatilization during drying, and represents a reaction inefficiency with respect to acetic acid which is by far the more expensive raw material.

I have unexpectedly discovered that the reaction of raw limestone with 150% of the stoichiometric acid is straightforward with virtually no loss of acid by volatilization. The damp intermediate product is dried as before to yield the anhydrous calcium acid-acetate. As taught in one of my co-pending applications, magnesium may replace up to 7 mol percent of the calcium in this product, with retention of the full amount of acid, viz, one mol of acetic acid per mol of alkaline earth metal acetate. With incorporation of more than this amount of magnesium, the acid content of the acid-acetate falls off. Magnesium may be introduced into the product of the present invention by feeding calcined magnesium-containing limestone along with raw limestone to the reactor. Magnesium can also be introduced in other ways familiar to those skilled in the art.

Most surprisingly, however, I have discovered that when less than 150% of the stoichiometric amount of acid is used the soluble portion of the product of reaction is not simply calcium acetate. Instead, it is a mixture containing calcium acetate and calcium acid-acetate, whose proportions vary somewhat depending upon the amount of acetic acid introduced relative to limestone. To illustrate, a series of reactions was carried out between pure calcium carbonate and pure 70% acetic acid solution. The results are shown in the table.

| REACTION OF CALCIUM CARBONATE WITH ACETIC ACID | |
|---|---|
| Acetic Acid, % Stoichiometric | Product Weight Relative to Theor. Ca(Ac)$_2$, % |
| 20 | 100.7 |
| 50 | 104.9 |
| 100 | 108.8 |
| 150 | 99% conversion to acid-acetate |

Product weights should have been less than the theoretical weights of calcium acetate in each case. Instead, products always weighed more than those resulting from the theoretical 100% conversion of calcium carbonate to calcium acetate. Furthermore, the overweights increase with increasing acid in the feed. Independent experiments prove that the overweights are not a result of hydrate formation.

The '100' entry under 'Acetic Acid, % Stoichiometric' in the table is selected for further elaboration. In this case 5.35 parts finely divided dry calcium carbonate were charged into the reactor. Slowly added to the reactor, with constant agitation, were 9.25 parts of 69.42% acetic acid. Reactants were initially at 68° F. The total amount of acid was added over a period of 84 minutes. Gas evolution from the reactor was observed to cease 53 minutes after the last increment of acid was added. Throughout the reaction period the contents of the reactor were dry, to very slightly damp, but always free-flowing. Independent experiments revealed that under some conditions a sticky reaction batch resulted when 70% acid was added too rapidly to the calcium carbonate. The preferred rate of acid addition depends upon a number of factors including total water added (to either the calcium carbonate or via the acid, or both) relative to dry calcium carbonate, the state of division of the calcium carbonate, and the rate of removal of water from the reaction batch.

Results are consistent with a product mixture containing calcium acetate an calcium acid acetate. The following reaction sequence illustrates the finding:

calcium carbonate + acetic acid ⟶ calcium acetate

calcium acetate + acetic acid ⟶ calcium acid-acetate

Also surprising was the result of measuring the pH's of the above products when added to water:

| pH of Product Solutions (1 part product/9 parts water) | |
|---|---|
| Acetic Acid, % Stoichiometic | pH |
| 20 | 7.0 |
| 50 | 7.2 |
| 100 | 7.5 |
| 150 | 5.6 |

Instead of approaching the straight acid-acetate pH of 5.6, products showed an increase in pH as more acid was used in the reaction. This is a concentration effect; as more acid is used, the relatively more soluble product is formed (i.e., the relatively less unreacted limestone is present in the product). But the major reason for the relatively high pH of product solutions is the neutralization of calcium acid-acetate when the solutions are made up for pH testing:

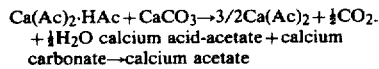

In other words, reactions which could not proceed very far under the relatively concentrated (dry) conditions of the reaction batch can proceed much further in the relatively dilute condition of the pH test due to hydrolysis and its consequences. The practical consequence of this fact is that in general the products of limestone/acid reactions according to my reaction scheme ultimately yield a fairly neutral to slightly alkaline reaction when used as deicers. This is probably desirable from an environmental pollution standpoint. As mixtures approach the straight acid-acetate in composition, solution pH will approach the acid 5.6 because relatively less base is present to neutralize the acid-acetate in solution. Under some environmental conditions this more acidic agent may be acceptable.

Although this invention has been described in connection with specific forms thereof, it will be appreciated by those skilled in the art that a wide variety of equivalents may be substituted for those specific elements and steps of operation shown and described herein, that certain features may be used independently of other features, and that parts may be reversed, all without departing from the spirit and scope of this invention as defined in the appended claims.

I claim:

1. A process for manufacturing a combined deicing and traction agent comprising the following steps:
   (a) introducing crushed raw limestone into a rotary kiln or equivalent agitated reaction vessel;
   (b) adding aqueous acetic acid at a concentration of 50-90% by weight to the crushed raw limestone, with agitation;
   (c) regulating the total relative amount of acetic acid such that the mole ratio of acid, anhydrous basis, to calcium compounds in the limestone is in the range 0.4-3.0;
   (d) agitating the reaction batch for a period of time sufficient to achieve substantially complete reaction; and
   (e) drying the damp intermediate product of said reaction in a conventional manner to produce a dry, free-flowing product.

2. The process as defined in claim 1 wherein the temperature of the reactants is that of the ambient surroundings.

3. The process as defined in claim 1 wherein the aqueous acetic acid concentration is 70% by weight.

4. The process as defined in claim 1 wherein the mole ratio of acetic acid, anhydrous basis, to calcium compounds in the limestone is 3.0.

5. The process as defined in claim 1 wherein the mole ratio of acetic acid, anhydrous basis, to calcium compounds in the limestone is 1.0.

6. A method of deicing and providing traction on roads, highways or walkways comprising application, by conventional means, of the required amount of the product prepared by the process of claim 1.

7. A method of deicing and providing traction on roads, highways or walkways comprising application, by conventional means, of the required amount of calcium acid acetate.

8. A method of deicing and providing traction on roads, highways or walkways comprising application, by conventional means, of the required amount of calcium acetate/calcium acid acetate mixtures.

* * * * *